C. R. BARNES.
Millstone Dress.
No. 12,408.  Patented Feb. 20, 1855.
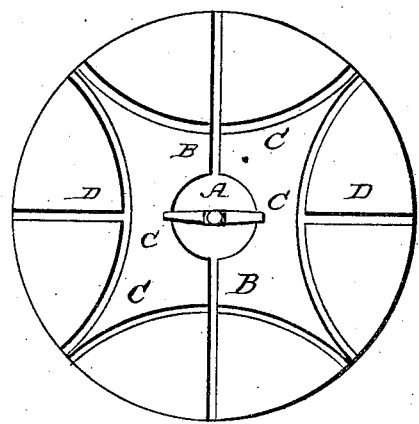
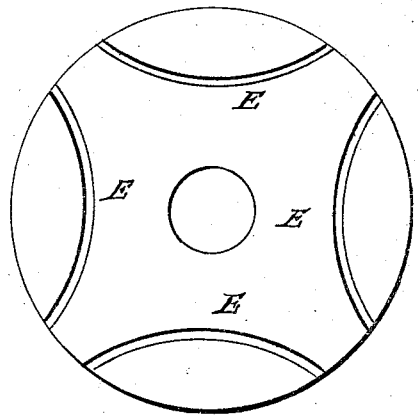
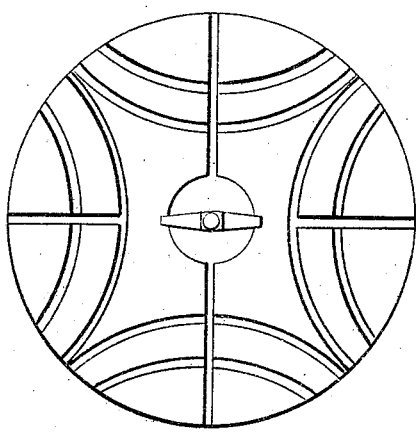

UNITED STATES PATENT OFFICE.

CHARLES R. BARNES, OF OWEGO, NEW YORK.

MILLSTONE-DRESS FOR HULLING RICE.

Specification of Letters Patent No. 12,408, dated February 20, 1855.

*To all whom it may concern:*

Be it known that I, CHARLES R. BARNES, of Owego, in the county of Tioga and State of New York, have invented a new and useful Improvement in Dressing Hulling-Stones for Hulling and Cleaning Rice; and I do hereby declare that the following is a full and exact description thereof, reference being had to the accompanying drawings and to the letters of reference marked thereon.

The nature of my invention consists in using two horizontal stones, dressed as follows: viz; curvilinear furrows in connection with straight furrows, cut upon the face of the runner as in Figure 1, of the accompanying drawing, and smaller curvilinear furrows upon the bed stone, as in Fig. 2, of said drawings, whereby the kernels are prevented from leaving the stones too fast, and are caused to rotate as well in the direction of their longest as shortest diameter, thereby completely loosening the hull and removing the floury substance upon the end of the kernel without breaking it; and also whereby the stones or hullers will do their work equally well, whether running with or against the sun.

The rice passing in between the stones, at the eye "A," of the runner (Fig. 1) is carried by the velocity of the stone, toward its outer edge, till it strikes the furrows, "B," when being turned upon its longest diameter, passes on to the curved furrows, "C C C C" (Fig. 1) when it is again turned upon its longest diameter and then coming in contact with curved furrows "E E E E" (Fig. 2) in connection with the curved furrows "C C C C" and straight furrows "D D" (Fig. 1), they are made to rotate in all directions and checked in their course toward the outer edge of, and prevented from leaving the stones too soon, whereby they are completely hulled and cleaned, from the floury substance upon the end.

Fig. 3 represents the furrows upon both runner and bed stone, when they are in position for working.

What I claim as my invention and desire to secure by Letters Patent is—

The method above described of dressing horizontal stones for hulling rice, the runner having curved furrows in connection with, or separate from straight furrows and the bed stone having smaller curves drafted thereon, substantially as herein described and shown.

CHARLES R. BARNES.

Witnesses present:
CHAS. H. SWEET,
E. S. SWEET.